United States Patent [19]
Uesugi et al.

[11] Patent Number: 6,013,379
[45] Date of Patent: Jan. 11, 2000

[54] COATED STEEL SHEET FOR ALKALINE DRY CELL POSITIVE ELECTRODE CANS

[75] Inventors: Taketo Uesugi, deceased, late of Moriguchi, by Hiromi Uesugi, Yasuyo Uesugi, Takashi Uesugi, legal representatives; Masaaki Kurimura; Kazuhiro Shikada, both of Moriguchi; Kenji Koshiishi, Ichikawa; Yasuharu Maeda, Ichikawa; Masahiro Murakami, Ichikawa; Tomonori Makino, Ichikawa, all of Japan

[73] Assignees: Nisshin Steel Co., Ltd., Tokyo; Sanyo Electric Co., Ltd.; Sanyo Excell Co., Ltd., both of Moriguchi, all of Japan

[21] Appl. No.: 08/727,628
[22] PCT Filed: Mar. 6, 1996
[86] PCT No.: PCT/JP96/00529
§ 371 Date: Jan. 14, 1998
§ 102(e) Date: Jan. 14, 1998
[87] PCT Pub. No.: WO96/32750
PCT Pub. Date: Oct. 17, 1996

[30] Foreign Application Priority Data

Apr. 12, 1995 [JP] Japan .................................. 7-111292

[51] Int. Cl.[7] .................................................. B21D 39/00
[52] U.S. Cl. ........................... 428/623; 428/626; 428/632; 428/679; 429/163; 429/164; 429/167
[58] Field of Search ..................... 428/623, 626, 428/632, 679, 323; 429/163, 164, 167, 177

[56] References Cited

U.S. PATENT DOCUMENTS

| | | | |
|---|---|---|---|
| 5,527,641 | 6/1996 | Koshiishi et al. | 429/163 |
| 5,792,553 | 8/1998 | Moriyama et al. | 428/323 |

OTHER PUBLICATIONS

Patent Abstracts of Japan 58–48361, Mar. 22, 1983.
Patent Abstracts of Japan 59–160959, Mar. 3, 1983.
Patent Abstracts of Japan 6–342653, Dec. 13, 1994.

*Primary Examiner*—Deborah Jones
*Assistant Examiner*—Bryant Young
*Attorney, Agent, or Firm*—Foley & Lardner

[57] ABSTRACT

A coated steel sheet for alkaline dry cell positive electrode cans, comprising a Ni-electroplated steel sheet having a chemical conversion coating formed on the surface thereof, and further formed thereon a resin coating film containing a conductive agent, wherein said coated steel sheet has a Ni coating layer made to have a hardness of from 300 to 650 as Vickers hardness. This coated steel sheet promises a superior coating adhesion after worked into positive electrode cans by pressing.

2 Claims, 3 Drawing Sheets

- RESIN COATING
- Ni COATING LAYER
- STEEL SHEET

- RESIN COATING
- Ni COATING LAYER
- STEEL SHEET

COATED STEEL SHEET FOR ALKALINE DRY CELL POSITIVE ELECTRODE CANS

TECHNICAL FIELD

This invention relates to a coated steel sheet comprised of a Ni-electroplated steel sheet that may cause less lowering of coating adhesion even when alkaline dry cell positive electrode cans (or anode cans) are manufactured by pressing.

BACKGROUND ART

Alkaline dry cells are conventionally used in low-voltage power sources of strobes, shavers, table clocks, portable acoustic equipment and electronic equipment and so forth. Positive electrode cans used in such cells are those manufactured by punching out a cold-rolled steel sheet or a Ni-electroplated steel sheet formed using the cold-rolled steel sheet as a material and working the resulting sections by multiple drawing into desired forms. However, positive electrode cans made of such materials have so poor a corrosion resistance that, when their inside surfaces come into contact with high-concentration electrolytes and positive electrode mixtures, oxide layers are formed on the surfaces of the positive electrode cans to cause a lowering of cell characteristics such as short-circuit current and electromotive force as time lapses.

Accordingly, as a countermeasure for such a problem, a method has been proposed in which the inside surface of a positive electrode can is coated with a conductive coating composition mixed with a carbon type conductive agent in a large quantity of, e.g., 100 to 300 parts by weight based on 100 parts by weight of resin so that its corrosion resistance can be improved. This is a method in which a carbon type conductive agent as exemplified by graphite powder or acetylene black is mixed into a coating composition comprising a resin with a good alkali resistance such as polyvinyl isobutyl ether or vinyl acetate resin and the resulting coating composition is applied to the inside surface of a positive electrode can (Japanese Patent Applications Laid-open No. 58-48361 and No. 59-160959).

Application of this conductive coating composition on positive electrode cans, however, must be carried out by a very cumbersome operation of spray-coating or brush-coating positive electrode cans one by one, followed by drying, and hence has had a poor productivity. In addition, since the positive electrode cans are small in diameter and yet deep, it has been very difficult from a technical viewpoint to uniformly coat the inside surfaces. Accordingly, there has been a demand for coated steel sheets from which positive electrode cans with a good quality can be efficiently manufactured by only machining.

To meet such a demand, the present inventors have proposed a coated metal sheet for dry cell positive electrode cans, comprising a metal sheet having a chromate film optionally formed thereon, and covered thereon with a coating film of a coating composition in which one or both of graphite powder and carbon black is/are mixed so that conductivity and workability can be balanced (Japanese Patent Application Laid-open No. 6-342653, U.S. Pat. No. 5,527,641, European Patent Application No. 94 909 315.7-2111).

This coated metal sheet comprises a metal sheet having a chromate film and covered thereon with a coating film mainly composed of at least one of an epoxy resin, an epoxy-acrylic resin and a polyester resin, containing a conductive agent comprising at least one of graphite powder having a purity of not less than 95%, having been made flaky to have an aspect ratio of not less than 50 and having an average particle diameter of not larger than 50 $\mu$m and carbon black having an oil absorption of not less than 250 ml/100 g as measured using DBP, or a coating film further incorporated with a cross-linking agent; the graphite powder and carbon black being contained in an amount falling in the range defined by straight lines connecting the respective proportions (including straight lines) of 20:0 and 100:0, 100:0 and 50:15, 50:15 and 0:20, 0:20 and 0:5, and 0:5 and 20:0, as graphite powder:carbon black proportions in parts by weight indicated by rectangular coordinates, and positive electrode cans can be manufactured only by machining.

However, when as this coated metal sheet a coated steel sheet comprised of a Ni-electroplated steel sheet obtained by applying single-layer Ni-coating on an ordinary cold-rolled steel sheet is used and the coated steel sheet is worked into positive electrode cans by pressing, a work stress due to differences in workability of the coating film and the steel sheet may be produced at the interface between the both to cause a lowering of coating adhesion. If alkaline dry cells are fabricated using positive electrode cans having such a disadvantage, the strongly alkaline electrolyte may enter in the interface between the coating film and the steel sheet to oxidize the steel sheet surface, resulting in a deterioration of cell characteristics with time.

Ni-electroplated steel sheets formed of cold-rolled steel sheets are conventionally used to manufacture cans of various types. When cans having a surface coating are manufactured, coated steel sheets are not used, but uncoated steel sheets are worked into cans, followed by printing to apply coating on the surface. Thus, almost no technical data relating to the workability of coated steel sheets comprised of Ni-electroplated steel sheets are available in the past, and no attempt has been made on improvements in the coating adhesion which may lower because of work stress.

An object of the present invention is to provide a coated steel sheet comprised of a Ni-electroplated steel sheet that may cause no lowering of coating adhesion due to work stress even when worked into alkaline dry cell positive electrode cans by pressing.

DISCLOSURE OF THE INVENTION

The coated steel sheet of the present invention is comprised of a Ni-electroplated steel sheet made to have a higher coating layer hardness, and is thereby improved in its coating adhesion after pressing. More specifically, it is a coated steel sheet for alkaline dry cell positive electrode cans, comprising a Ni-electroplated steel sheet having a chemical conversion coating formed on the surface thereof, and further formed thereon a resin coating film containing a conductive agent, wherein the coated steel sheet has a Ni coating layer made to have a hardness of from 300 to 650 as Vickers hardness.

BRIEF DESCRIPTION OF THE DRAWINGS

FIG. 1A shows an instance where a Ni-electroplated steel sheet having a Ni coating layer with a hardness Hv of 150 to 160; FIG. 1B, a hardness Hv of 250 to 260; and FIG. 1C, a hardness Hv of 400 to 410.

FIG. 3A shows an instance where fine cracks are produced in the Ni coating layer; and FIG. 3B, no fine cracks are produced.

BEST MODE FOR WORKING THE INVENTION

The present inventors have investigated the reason why the coating adhesion lowers when coated steel sheets comprised of Ni-electroplated steel sheets are worked into alkaline dry cell positive electrode cans by pressing. As a result, they have discovered that it is concerned with the hardness of Ni coating layers. Then, as a result of further investigation, it has been found that the coating adhesion does not lower when the hardness thereof is made higher.

Figure 1A:
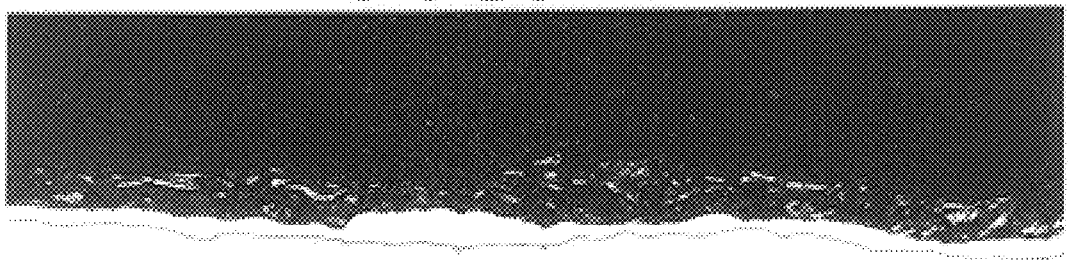
FIGS. 1A to 1C show coating layers of alkaline dry cell positive electrode cans manufactured by pressing, using a Ni-electroplated steel sheet coated with a conductive coating composition.
Figure 1B:
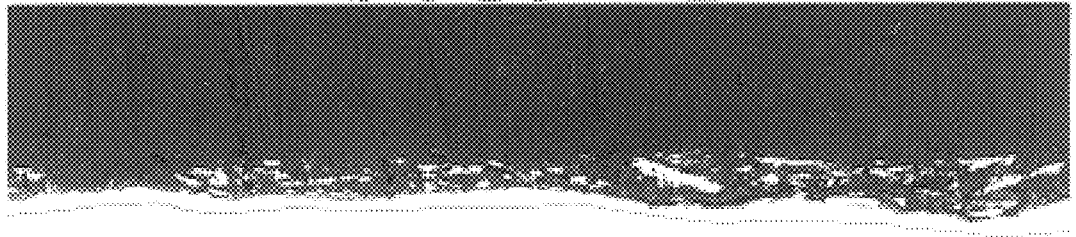
Figure 1C:
Figure 2:
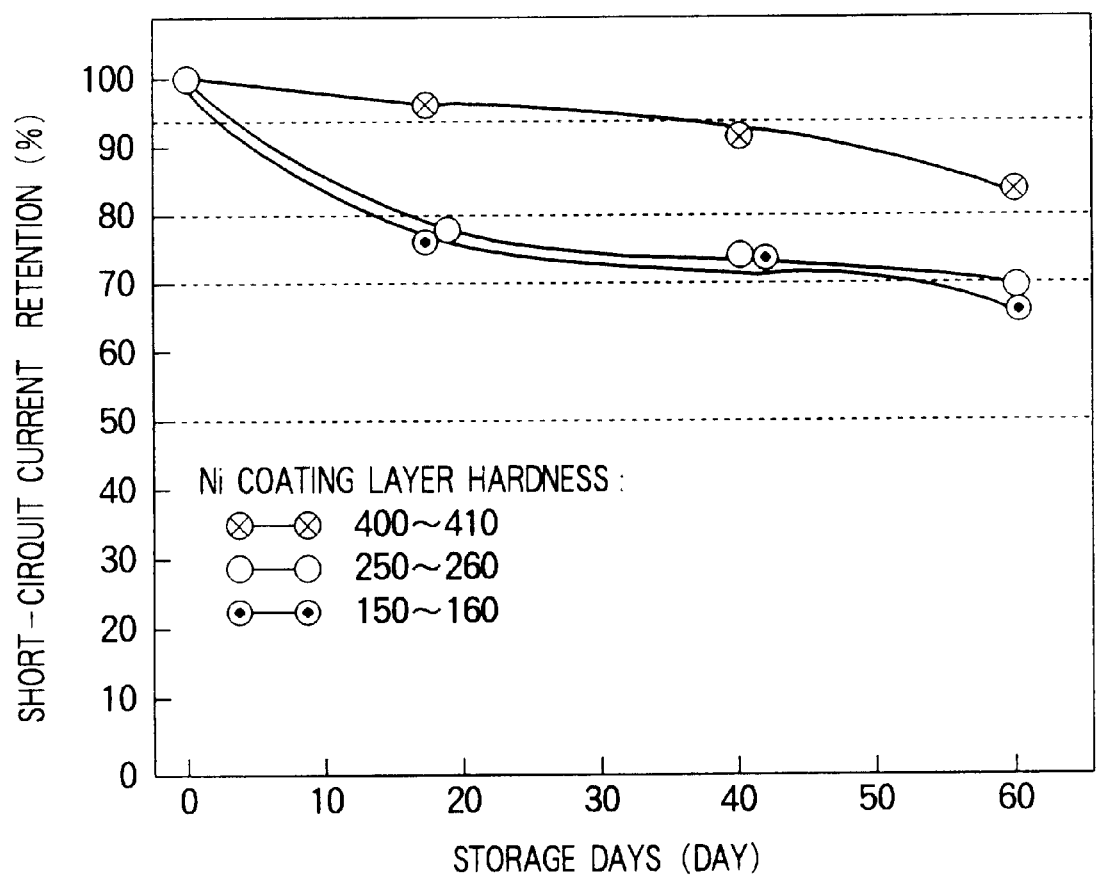
FIG. 2 is a graph showing the relationship between storage days and short-circuit current retention in the case when positive electrode cans respectively having the coating layers shown in FIGS. 1A to 1C are assembled into alkaline dry cells, which are thereafter stored in an environment of temperature 60° C. and relative humidity 90%.

FIGS. 1A to 1C respectively show cross sections of Ni coating layers at the can bodies of those manufactured by chromate-treating Ni-electroplated steel sheets (obtained by electroplating Ni with a Ni content of 99.9% or more on a cold-rolled steel sheet so as to be 1 to 4 μm thick) in a Ni-coating hardness of 150 to 160, 250 to 260 and 400 to 410 as Vickers hardness, respectively, and thereafter forming thereon a coating film of an epoxy resin conductive coating composition in which graphite powder and carbon black are mixed in an amount of 60 parts by weight and an amount of 5 parts by weight, respectively, based on 100 parts by weight of the resin; the coated steel sheets being pressed into cylindrical positive electrode cans (diameter: 13.85 mm; depth: 50.35 mm). FIG. 2 shows short-circuit current retention in the case when the respective positive electrode cans are assembled into alkaline dry cells, which are thereafter stored in an environment of temperature 60° C. and relative humidity 90%.

To make comparison on FIGS. 1A to 1C and FIG. 2, the positive electrode can shown in FIG. 1(A) has a Ni coating layer with so low a hardness that the Ni coating layer is elongated with pressing and no cracks are produced in the Ni coating layer. Such a positive electrode can, however, causes a lowering of short-circuit current retention with an increase in storage days, as shown in FIG. 2. No cracks are produced also in the Ni coating layer in the case of the positive electrode can shown in FIG. 1B, which therefore causes a lowering of short-circuit current retention with an increase in storage days. However, in the case of the positive electrode can shown in FIG. 1C, fine cracks are produced in the Ni coating layer, and hence it less causes a lowering of short-circuit current retention with an increase in storage days.

Figure 3A:
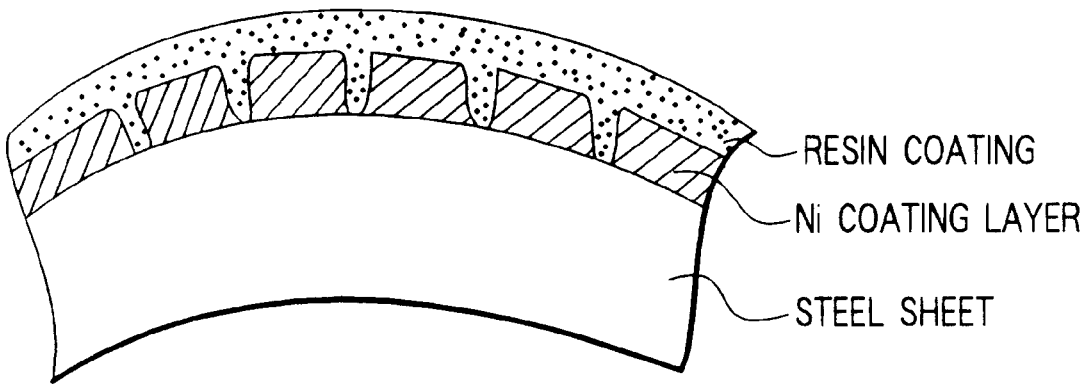
FIGS. 3A and 3B diagrammatically illustrate the relationship between occurrence of fine cracks and coating adhesion in Ni coating layers in the case when alkaline dry cell positive electrode cans were manufactured by pressing, using the Ni-electroplated steel sheet coated with a conductive coating composition.
Figure 3B:
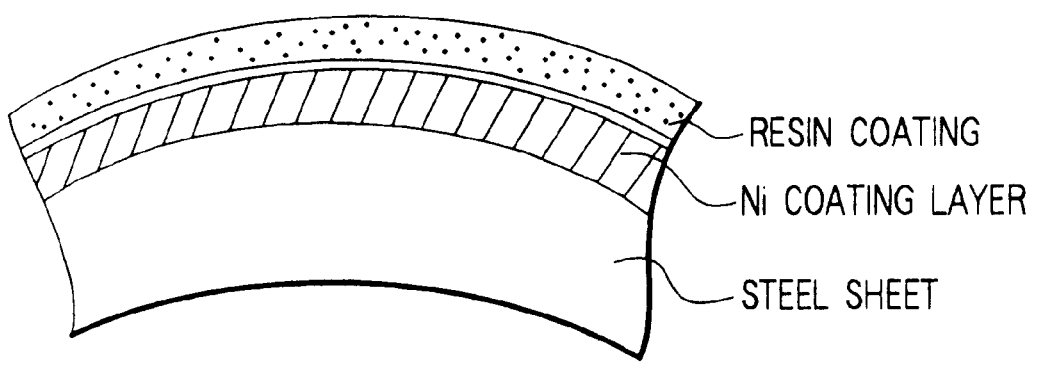

As is seen from these results, the coated steel sheet comprised of a Ni-electroplated steel sheet causes no lowering of coating adhesion when the Ni coating layer is made to have a high hardness so that cracks are produced in the coating layer in the course of pressing. The reason therefor is presumed as follows: FIGS. 3A and 3B diagrammatically illustrate cross sections of positive electrode cans in the case when cracks are produced and the case when they are not produced. When fine cracks are produced as shown in FIG. 3A, the resin coating is brought down into the fine cracks by the stroke with a punch. Hence, it is presumed that even if the work stress is produced at the interface between the Ni coating layer and the resin coating, the coating adhesion little lowers on account of anchor effect. In the case of the positive electrode can shown in FIG. 1C, the resin coating is brought down into the fine cracks of the Ni coating layer. On the other hand, in the case when no fine cracks are produced in the Ni coating layer as in the case of FIG. 3B, it is presumed that there is no anchor effect attributable to the resin coating brought down into them and hence the coating adhesion can not withstand the work stress produced by differences in elongation between the Ni coating layer and the resin coating.

Based on the foregoing results, the present inventors have studied the relation of coating adhesion with respect to coated steel sheets comprised of Ni-electroplated steel sheets having Ni coating layers with further different hardness. As a result, from the fact that no fine cracks are seen when the Ni coating layers have Vickers hardness of from 260 to 300 and the short-circuit current retention greatly lowers, it has been found that the Ni coating layer may be made to have a hardness of 300 or higher. In order to make the hardness of the Ni coating layer higher by Ni electroplating, they have also made various studies while changing bath composition and electrolysis conditions, and found it to be difficult to make the hardness higher than 650 as Vickers hardness. Hence, in the present invention, hardness of the Ni coating layer of a material steel sheet is defined to be from 300 to 650 as Vickers hardness.

In general, in the case of coated steel sheets formed by metal plating, the lower hardness coating layers have, the better elongation the coating layers have. Hence, such coated steel sheets have an improved workability for pressing. However, in the case of the coated steel sheet comprised of the Ni-electroplated steel sheet, the matter stands opposite, i.e., the higher hardness the coating layer has, the better workability for pressing it has.

The Ni-electroplated steel sheet used as a coated material in the coated steel sheet of the present invention may preferably be formed of a cold-rolled steel sheet plated with Ni having a Ni content of 99.9% or more and the balance being inevitable impurities, in a coating thickness of from 1 μm to 4 μm per one side. If the coating layer has a thickness smaller than the above range, the positive electrode cans may be unsatisfactory for their outer surface corrosion resistance, conductivity (or contact performance to machinery), appearance and so forth. If on the other hand it has a too large thickness, excessive cracks may be produced (to cause powdering), and also economical disadvantage may result.

The Ni coating layer can be made to have a hardness of from 300 to 650 as Vickers hardness by controlling bath composition, additives, electrolysis conditions and so forth.

EXAMPLES

Ni-electroplated steel sheets (Ni content in the coating layer: 99.9% or more; single-layer plating; coating layer thickness: 3 μm) obtained by subjecting a cold-rolled steel sheet with a sheet thickness of 0.25 mm to Ni electroplating were coated on each one side thereof with a coating type chromating solution to form a chromate film having a chromium coating weight of 7±2 mg/m$^2$) followed by drying. Thereafter, on the chromate film thus formed, a conductive coating composition comprising an epoxy resin mixed with graphite powder and carbon black was coated by means of a bar coater so as to be in a dried coating layer thickness of 5±1 μm, followed by baking at a maximum sheet temperature of 215° C. for a drying time of 50 seconds to cause the coating to cure. Next, this coated steel sheet was punched, and then worked by pressing, into cylindrical positive electrode cans (diameter: 13.85 mm; depth: 50.35 mm; with the coated surface inside), to examine fine cracks produced in the Ni coating layer on the inner surface of each positive electrode can. The positive electrode cans were further assembled into cells to examine changes in cell characteristics with time. The results of examination are shown in Table 1.

The coating type chromating solution used was a known chromating solution containing 70 g/lit. of $CrO_3$, 60% of hexavalent chromium based on the whole chromium, 2.5% of silica powder and 4% of acrylic emulsion resin and to which carbon black was added in an amount equal to that of the solid matter of the chromating solution. The conductive coating composition used was a coating composition prepared by mixing in 100 parts by weight of an epoxy resin incorporated with a cross-linking agent, 50 parts by weight of graphite powder having a purity of not less than 95%, having been made flaky to have an aspect ratio of not less than 50 and having an average particle diameter of not larger than 50 $\mu$m, and 5 parts by weight of carbon black having an oil absorption of not less than 250 ml/100 g as measured using DBP. Here, the epoxy resin incorporated with a cross-linking agent was bisphenol-A epoxy resin PHENOTOTO YP-50PK-35, available from Toto Chemical Co., Ltd. In this resin, methylated melamine resin NIKALUCK MW-24X, available from Sanwa Chemical Co., Ltd., had been mixed as a cross-linking agent in an amount of 10 parts by weight based on 100 parts by weight of the resin.

The fine cracks in the Ni coating layer and the changes in cell characteristics with time were examined in the following way.

(1) Examination of fine cracks of the Ni coating layer:

Ni coating layers were observed using an optical microscope (500 magnifications). An instance where fine cracks were uniformly produced all over was evaluated as "A"; they were locally produced, as "B"; and not produced as "C".

(2) Examination of short-circuit current:

Positive electrode cans were assembled into AM3 alkaline dry cells. Their short-circuit currents were measured immediately after they were assembled and after left for 20 days in an environment of temperature 60° C. and humidity 90%, to calculate the retention of short-circuit currents as values of (the latter/the former)×100. An instance where the retention was 95% or more was evaluated as "AA"; 80% to less than 95%, as "A"; and less than 80%, as "C".

TABLE 1

| | Ni coating layer | | |
| --- | --- | --- | --- |
| | Hardness (Hv) | State of fine cracks produced | Retention of short-circuit current (%) |
| Example: | | | |
| 1 | 305 | A | A |
| 2 | 350 | A | AA |
| 3 | 410 | A | AA |
| 4 | 450 | A | AA |
| 5 | 540 | A | AA |
| 6 | 640 | A | AA |
| Comparative Example: | | | |
| 1 | 290 | B | C |
| 2 | 255 | C | C |
| 3 | 160 | C | C |

It is claimed:

1. A coated steel sheet for alkaline dry cell positive electrode cans, comprising a Ni-electroplated steel sheet having a chemical conversion coating formed on the surface thereof, and further formed thereon a resin coating film containing a conductive agent, wherein said coated steel sheet has a Ni coating layer having a hardness of from 300 to 650 as Vickers hardness.

2. The coated steel sheet for alkaline dry cell positive electrode cans according to claim 1, wherein said Ni-electroplated steel sheet is a cold-rolled steel sheet plated with Ni having a Ni content of 99.9% or more and the balance being inevitable impurities, and a coating thickness of from 1 $\mu$m to 4 $\mu$m per one side.

* * * * *

UNITED STATES PATENT AND TRADEMARK OFFICE
CERTIFICATE OF CORRECTION

PATENT NO. : 6,013,379
DATED : January 11, 2000
INVENTOR(S) : Uesugi et al.

It is certified that error appears in the above-identified patent and that said Letters Patent is hereby corrected as shown below:

Cover page,
Item [75] Assignee, please delete "Sanyo Excell Co., Ltd." and insert therefor -- Sanyo Energy Tottori Co., Ltd. --.

Signed and Sealed this

Fourteeth Day of August, 2001

*Attest:*

NICHOLAS P. GODICI
*Attesting Officer*     Acting Director of the United States Patent and Trademark Office